United States Patent
Beuss et al.

(10) Patent No.: US 8,356,838 B2
(45) Date of Patent: Jan. 22, 2013

(54) FRONT SPRING BRACKET FOR A TRUCK

(75) Inventors: Hartmut Beuss, Fellbach (DE); Norbert Sonsalla, Wernau (DE); Wilhelm Stockklausner, Plochingen (DE)

(73) Assignee: Daimler AG, Stuttgart (DE)

( * ) Notice: Subject to any disclaimer, the term of this patent is extended or adjusted under 35 U.S.C. 154(b) by 192 days.

(21) Appl. No.: 12/934,082

(22) PCT Filed: Mar. 17, 2009

(86) PCT No.: PCT/EP2009/001971
§ 371 (c)(1),
(2), (4) Date: Sep. 23, 2010

(87) PCT Pub. No.: WO2009/121478
PCT Pub. Date: Oct. 8, 2009

(65) Prior Publication Data
US 2011/0025035 A1  Feb. 3, 2011

(30) Foreign Application Priority Data
Apr. 2, 2008  (DE) .......................... 10 2008 016 924

(51) Int. Cl.
*B62D 21/00*  (2006.01)
*B62D 21/15*  (2006.01)
(52) U.S. Cl. ........................................ 280/781; 280/785
(58) Field of Classification Search .................. 280/781, 280/785, 124.109
See application file for complete search history.

(56) References Cited

U.S. PATENT DOCUMENTS

| | | | | |
|---|---|---|---|---|
| 5,085,485 A * | 2/1992 | Wurl | | 296/204 |
| 5,897,139 A * | 4/1999 | Aloe et al. | | 280/781 |
| 5,947,519 A * | 9/1999 | Aloe et al. | | 280/785 |
| 6,193,273 B1* | 2/2001 | Novak et al. | | 280/781 |
| 7,771,137 B2* | 8/2010 | Anzai et al. | | 403/379.3 |
| 7,805,840 B2* | 10/2010 | Bingham et al. | | 29/897.2 |
| 7,828,330 B2* | 11/2010 | Tamura et al. | | 280/788 |
| 2005/0082782 A1* | 4/2005 | Jolley | | 280/124.109 |
| 2006/0097502 A1* | 5/2006 | Bingham et al. | | 280/781 |
| 2008/0238115 A1 | 10/2008 | Chong | | |
| 2010/0038893 A1* | 2/2010 | Stolle et al. | | 280/781 |

FOREIGN PATENT DOCUMENTS

| | | |
|---|---|---|
| DE | 19603954 A1 | 8/1997 |
| DE | 102004018052 A1 | 11/2005 |
| EP | 1454816 A2 | 9/2004 |
| EP | 1676769 A2 | 7/2006 |
| WO | 2006018721 A1 | 2/2006 |
| WO | 2007104413 A1 | 9/2007 |

\* cited by examiner

*Primary Examiner* — Drew Brown
(74) *Attorney, Agent, or Firm* — Patent Central LLC; Stephan A. Pendorf

(57) ABSTRACT

The invention relates to a front spring bracket (18) for a truck, wherein said bracket can be attached to the front end of a vehicle frame (10) and comprises a side part (20) associated with a respective longitudinal frame carrier (12, 14) of the vehicle frame (10), which are connected to each other by way of at least one cross-member (22), wherein at least parts (20) of the front spring bracket (18) are configured as aluminum castings.

3 Claims, 1 Drawing Sheet

FRONT SPRING BRACKET FOR A TRUCK

Figure 1:
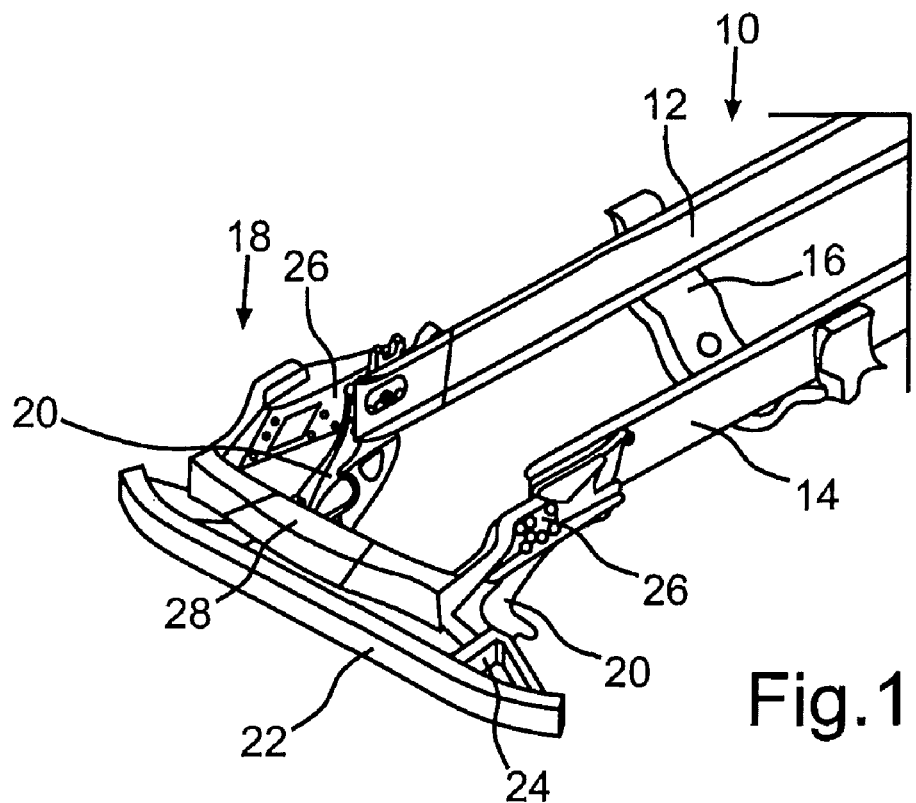

The invention relates to a front spring bracket for a truck of the type specified in the preamble of claim 1.

Front spring brackets of this type are known from standard truck building processes. A front spring bracket of this type is usually attached to the underside of a vehicle frame at its front end and may for example support components of an under-run guard. The front spring bracket usually comprises two side parts, each of which is attached, in particular bolted, to the respective frame side member of the vehicle frame, and which are usually joined to each other by a crossmember extending below the vehicle frame.

In addition to the general desire to reduce the overall weight of the vehicle, which allows the payload to be increased, trucks are subject to the additional need for reducing the front axle load accordingly.

The present invention is therefore based on the problem of designing a front spring bracket of the type referred to above which offers advantages in terms of weight.

According to the invention, this problem is solved by a front spring bracket with the features of patent claim 1. Advantageous variants with expedient and non-trivial further developments are specified in the remaining patent claims.

In order to design a front spring bracket which offers advantages in terms of weight, the invention provides that at least parts of the front spring bracket are designed as aluminum castings or as aluminum alloy castings. This offers in particular the advantage that aluminum and aluminum alloys have a density of, for example, approximately 2.71 kg/dm$^3$, while materials such as cast iron have a density of 7.25 kg/dm$^3$. By using aluminum or a suitable aluminum casting alloy, the weight of the front spring bracket can therefore be reduced considerably, which not only increases the payload which can be transported, but moreover reduces the front axle load in an advantageous manner. As the front spring bracket is located close to the front axle, a reduction of the weight of at least parts of the front spring bracket has a particularly beneficial effect on the front axle load.

In a further development of the invention, it has been shown to be particularly advantageous if at least the side parts of the front spring bracket are designed as aluminum castings. These side parts in particular offer high potential savings, so that in a standard front spring bracket a weight of 38 kg may be saved by using an aluminum casting alloy in the region of the side parts, which corresponds to approximately 50% of the weight of the front spring bracket. In this context, it is particularly advantageous that the existing overall volume of the component can be maintained at least to a large extent by producing the side parts from an aluminum casting alloy. A further advantage is offered by the fact that loading conditions can be met particularly easily by using an aluminum casting alloy of this type.

It has finally been found to be advantageous if the crossmember joining the side parts is made of an aluminum material as well. It would for example be conceivable to design the crossmember as an extruded part in order to utilise additional opportunities for savings in vehicle weight in the region of the front spring bracket.

Figure 2:
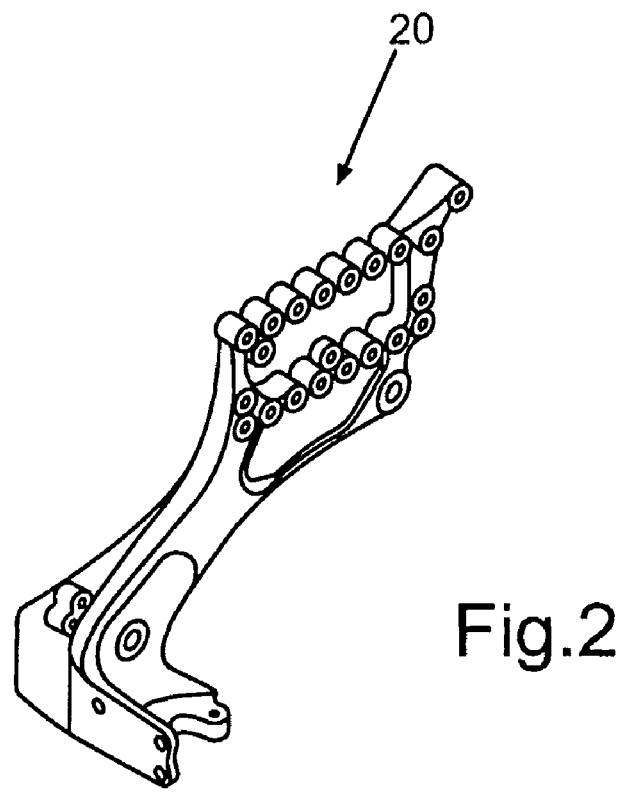

Further advantages, features and details of the invention can be derived from the following description of a preferred embodiment and from the drawings, of which:

FIG. 1 is a sectional perspective view of the front end of a vehicle frame of a truck to which a front spring bracket is attached and which comprises side parts assigned to respective frame side members of the vehicle frame, wherein the two side parts are joined to each other by a crossmember and wherein the side parts of the front spring bracket are designed as aluminum castings; and FIG. 2 is a perspective view of one of the two side parts of the front spring bracket according to FIG. 1, which is designed as an aluminum casting.

FIG. 1 is a sectional perspective view of the front end of a vehicle frame 10 of a truck. The vehicle frame 10 of the illustrated embodiment comprises two frame side members 12, 14, which extend substantially parallel and horizontally in the longitudinal direction of the vehicle and are joined to one another by a plurality of crossmembers 16.

A front spring bracket 18 is attached to the front end of the vehicle frame 10. In detail, the front spring bracket 18 comprises two side parts 20, one of which is shown in a perspective view in FIG. 2.

In the present case, the front spring bracket 18 forms an under-run guard with the aid of a crossmember 22 which indirectly joins the two side parts 20 to each other. In the present case, this indirect connection involves respective deformation elements 24, by way of which the crossmember 22 is supported on the respective side part 20 towards the rear.

The special feature of the front spring bracket 18 is that the side parts 20 are designed as aluminum castings. This in particular offers the advantage that aluminum has a density of 2.71 kg/dm$^3$ and is therefore considerably lighter that cast iron for example, of which the side parts 20 are usually made and which has a density of 7.25 kg/dm$^3$. This reduces the weight of the front spring bracket 18 by approximately 50% compared to a cast iron design. The existing overall volume is in the present case at least substantially maintained. In the specific embodiment, the weight of the front spring bracket 18 is reduced by 38 kg by using the aluminum material or the aluminum casting alloy. As the front spring bracket 18 is located close to the front axle, the front axle load is also reduced by approximately 38 kg, allowing a higher payload to be transported.

FIG. 1 further shows that further side parts 26 joined to each other by a crossmember 28 are provided on the outside of the side parts 20. While the side parts 26 and the crossmember 28 essentially extend at the level of the vehicle frame 10, the crossmember 22 of the front spring bracket 18 in particular is placed at a considerable distance below the crossmember 28 or the vehicle frame 10 respectively.

The invention claimed is:

1. A front spring bracket (18) for a truck, adapted to be attached to the front end of a vehicle frame (10) and which comprises:
    side parts (20), each of which is assigned to a frame side member (12, 14) of the vehicle frame (10) and
    at least one cross-member (22) joining the side parts (20), wherein at least the side parts (20) of the front spring bracket (18) are aluminum castings,
    wherein the cross-member (22) joining the side parts (20) to each other is made of an aluminum material,
    wherein the cross-member (22) joining the side parts (20) to each other is provided at a considerable distance below the vehicle frame (10) whereby the front spring racket (18) forms an under-run guard, and
    wherein the cross-member (22) is connected to the respective side part (20) via an intermediate deformation element (24) provided on the rear of the cross-member (22).

2. A truck frame (10) including first and second side members (12, 14), each side member having a front end and a back end, and including a spring bracket (18) attached to the front end of the frame (10), wherein the spring bracket (18) comprises:

side parts (20), each of which is assigned to a frame side member (12, 14) of the vehicle frame (10) and at least one cross-member (22) joining the side parts (20), wherein at least the side parts (20) of the front spring bracket (18) are aluminum castings, wherein the cross-member (22) joining the side parts (20) to each other is made of an aluminum material, wherein the cross-member (22) joining the side parts (20) to each other is provided at a considerable distance below the vehicle frame (10) whereby the front spring racket (18) forms an under-run guard, and wherein the cross-member (22) is connected to the respective side part (20) via an intermediate deformation element (24) provided on the rear of the cross-member (22).

3. The truck frame according to claim 2, further comprising further side parts (26) outside of the side parts (20), said further side parts (26) joined to each other by a cross-member (28) extending essentially at the level of the vehicle frame (10).

* * * * *